US008692886B2

(12) United States Patent
Ennis

(10) Patent No.: US 8,692,886 B2
(45) Date of Patent: Apr. 8, 2014

(54) MULTIDIRECTIONAL VIDEO CAPTURE ASSEMBLY

(76) Inventor: Timothy James Ennis, Seattle, WA (US)

(*) Notice: Subject to any disclaimer, the term of this patent is extended or adjusted under 35 U.S.C. 154(b) by 1285 days.

(21) Appl. No.: 11/932,883

(22) Filed: Oct. 31, 2007

(65) Prior Publication Data

US 2009/0109292 A1 Apr. 30, 2009

(51) Int. Cl.
*H04N 7/18* (2006.01)
*G09G 5/00* (2006.01)

(52) U.S. Cl.
USPC ............ 348/158; 348/81; 348/E7.085; 345/8

(58) Field of Classification Search
USPC ............................ 348/158, 81, E7.085; 345/8
See application file for complete search history.

(56) References Cited

U.S. PATENT DOCUMENTS

| 5,657,073 A * | 8/1997 | Henley .......................... 348/38 |
| 7,432,806 B2 * | 10/2008 | Radin ...................... 340/539.13 |
| 2003/0215010 A1 * | 11/2003 | Kashiwa ................. 375/240.02 |
| 2004/0227628 A1 * | 11/2004 | Burdick ....................... 340/479 |
| 2005/0200750 A1 * | 9/2005 | Ollila ............................ 348/375 |
| 2006/0055786 A1 * | 3/2006 | Ollila ....................... 348/207.99 |
| 2006/0277666 A1 * | 12/2006 | Gertsch et al. .................... 2/424 |
| 2007/0271687 A1 * | 11/2007 | Zhou ................................. 2/410 |
| 2008/0183049 A1 * | 7/2008 | Karkanias et al. ............ 600/301 |
| 2009/0284645 A1 * | 11/2009 | Nozaki et al. ................ 348/349 |

OTHER PUBLICATIONS

U.S. Appl. No. 11/932,919 Timothy James Ennis, filed Oct. 31, 2007.
"Neoprene Cap—Helmet Camera," Helmet Camera, http://www.helmetcamera.com/hcimages/NeopreneCap_400.jpg, downloaded 2007, 1 page.
"Surveillance Products > I.V.A.C.S 360," Aventura Technologies, http://www.aventuratechnologies.com/products/product_detail.asp?clProdID=275, 2007, 3 pages.
"TacEye Display Military Applications," Vuzix, http://www.vuzix.com/tactical/taceye_display_military_applications.html, downloaded 2007, 1 page.

* cited by examiner

*Primary Examiner* — Ninos Donabed
*Assistant Examiner* — Thomas Richardson
(74) *Attorney, Agent, or Firm* — Skaar Ulbrich Macari, P.A.

(57) ABSTRACT

A multidirectional video capture assembly is provided that can include a multidirectional helmet camera with protective housing and plurality of image sensors. The image sensors may be oriented in a plurality of directions for simultaneous capture of image data. A multi channel flexible cable can emerge from said protective housing, said cable adapted to carry image signals from the image sensors to an image recording and/or image display device. The protective housing may also be equipped with a complimentary equipment cavity for inclusion of additional advantageous equipment, as may be included to suit individual circumstances.

33 Claims, 7 Drawing Sheets

MULTIDIRECTIONAL VIDEO CAPTURE ASSEMBLY

BACKGROUND

Personal video capture is making exciting advances as the size of cameras shrinks, the cost of electronic recording comes within reach of the average consumer, and the ease of digitally archiving and sharing video improves.

Enthusiasts in a variety of endeavors ranging from car and bike racing to skydiving, paintball, skiing and snowboarding can now capture their experiences on video. However, video captured from today's "helmet cameras" and other personal video capture systems is incomplete.

In one arrangement, for example, a camera is mounted on a helmet in a forward orientation, recording only what the user looks at. However, this video stream may not and frequently does not provide the best information about the surroundings, actions, and movements of the user.

The industry is in need of a multidirectional video capture assembly, and for corresponding apparatus for deploying such an assembly, organizing captured footage, and integrating additional useful features.

SUMMARY

A multidirectional video capture assembly is provided that can include a multidirectional helmet camera comprising, for example, a protective housing that can be secured atop a helmet with a plurality of image sensors disposed therein. The image sensors may be oriented in a plurality of directions for simultaneous capture of image data. A multi channel flexible cable can emerge from said protective housing, said cable adapted to carry image signals from the image sensors to an image recording and/or image display device. A variety of attaching means may be used to secure the protective housing atop a helmet or other host, such as the roof of a car, as will be appreciated. The protective housing may also be equipped with a complimentary equipment cavity for inclusion of additional advantageous equipment, as may be included to suit individual circumstances. Other advantages and features of the invention are described below.

BRIEF DESCRIPTION OF THE DRAWINGS

The systems and methods provided in connection with the multidirectional video capture assembly provided herein further described with reference to the accompanying drawings in which.

DETAILED DESCRIPTION

Certain specific details are set forth in the following description and figures to provide a thorough understanding of various embodiments of the invention. Certain well-known details associated the technology are not set forth in the following disclosure, however, to avoid unnecessarily obscuring the various embodiments of the invention. Further, those of ordinary skill in the relevant art will understand that they can practice other embodiments of the invention without one or more of the details described below.

Figure 1:
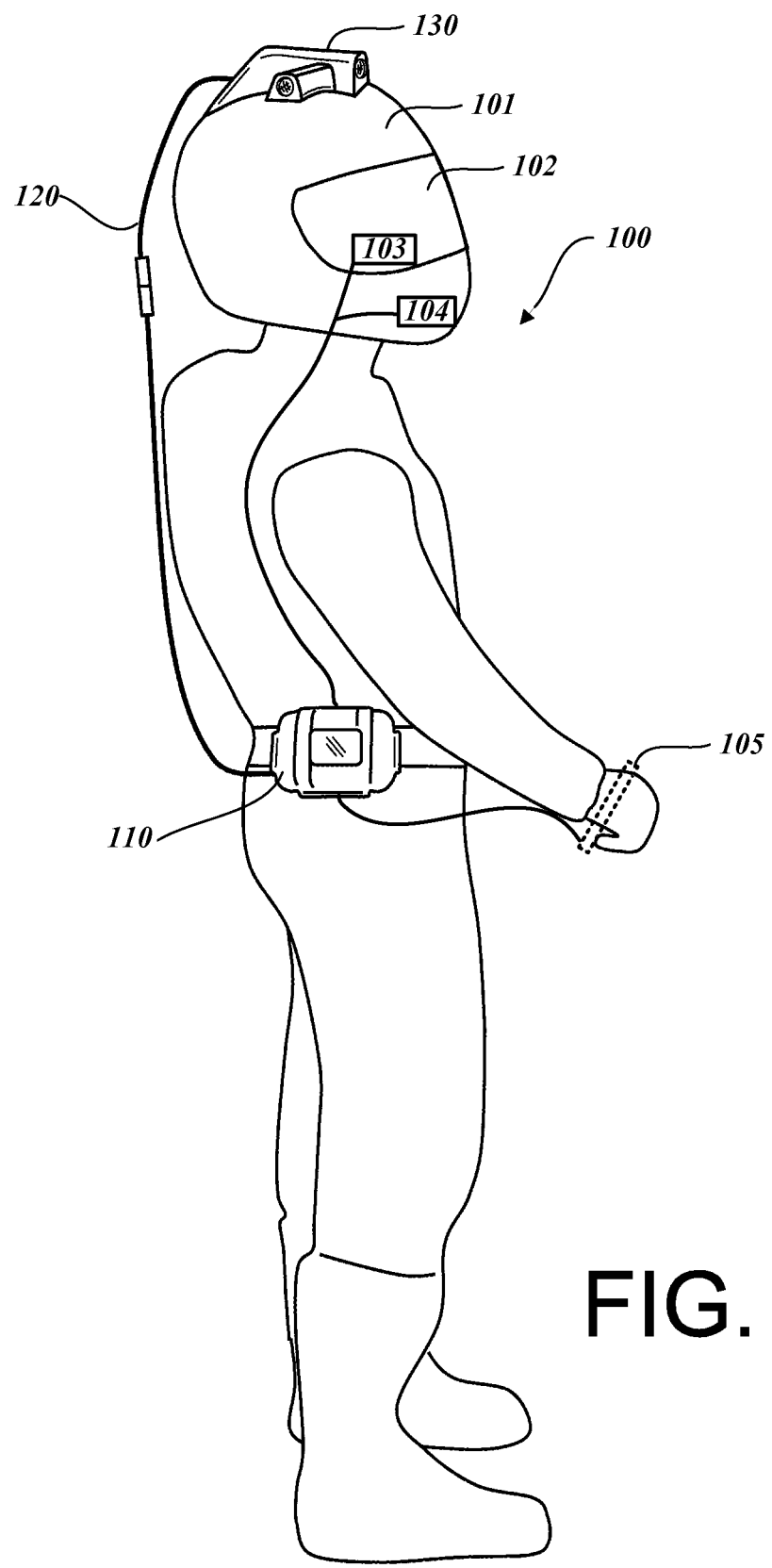
FIG. 1 illustrates a person using an exemplary multidirectional video capture assembly.

FIG. 1 illustrates a person 100 using an exemplary multidirectional video capture assembly. In the illustrated embodiment, the multidirectional video capture assembly comprises a multidirectional helmet camera 130, a multi channel flexible cable 120 emerging from said helmet camera 130, and an image recording device optionally disposed within a protective case 110. Aspects of a video capture assembly are described in detail in U.S. patent application Ser. No. 11/932,919 which is incorporated by reference for all of its teachings and embodiments.

The helmet camera 130 may be attached atop a helmet 101. In the illustrated embodiment, helmet comprises a visor 102. A wide variety of helmets are available today, and many are designed for specific activities such as motorcycling, skydiving, mountain biking, skiing or snowboarding, and so on. It will be appreciated that helmet camera could be configured to sit atop any helmet type, as well as on other hosts such as the roof of a car, the fuselage of an aircraft, SCUBA gear, the human head without a helmet or the head of an animal used in sporting activities such as a horse, dog, or bull. In certain scenarios it may be advantageous to design the helmet camera 130 to be multi purpose, by allowing it to be easily attachable to multiple different hosts. For example, in the case of racing enthusiasts, the helmet camera might be designed to be quickly and securely attachable to both a motorcycle helmet and the roof of a car.

The video storage device in case 110 may be coupled to any of a variety of input or output devices, as is described in greater detail below. FIG. 1 illustrates a Heads Up Display (HUD) 103 integrated with the visor 102. The HUD 103 can provide for example a real time display from a rear (south) facing image sensor integrated with helmet camera 130. The HUD 103 is thus an example of an output device coupled to a video recording device disposed in the case 110. In one embodiment, the HUD may be, for example, a TACEYE® display made by Vuzix Corporation of Rochester, N.Y.

Exemplary input devices illustrated in FIG. 1 are the microphone 104 and user control device 105. The microphone 104 can receive audio signals and, for example, relay them to the video recording device disposed in the case 110 for recording along with captured video. The audio signal may also be relayed, e.g., by communications apparatus integrated in case 110 to one or more other wearers of a video capture assembly, for example providing communications for members of a police, military, or firefighting team.

The user control device 105 may, in one embodiment, comprise a grip switch that allows the person 100 to start and stop recording by the recording device. It will be appreciated that user control device 105 could be replaced with any number of other input devices that provide control information and/or other data to the video recording device. For example, device 105 could be a bite switch, a monitoring device such as a heart rate monitor, a vehicle computer, or a sensor on a firearm that detects when shots are fired.

Figure 2:
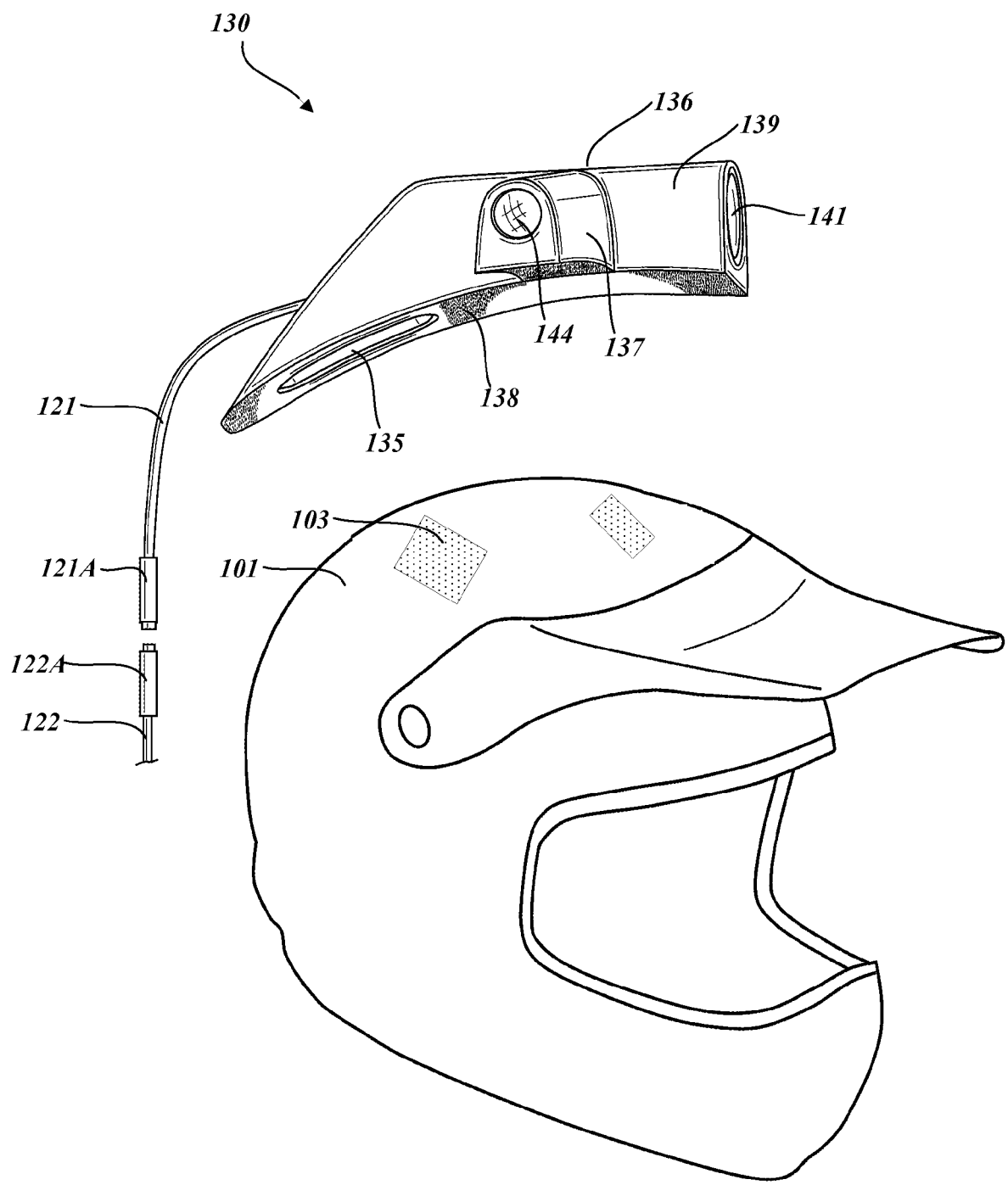
FIG. 2 illustrates multidirectional helmet camera in greater detail.

FIG. 2 illustrates multidirectional helmet camera 130 in greater detail. In the illustrated embodiment, helmet camera 130 comprises a protective housing 136 and exemplary image sensors 141, 144 disposed therein. While illustrated embodiments contemplate four image sensors oriented north, south, east and west (where north is defined as the forward direction of the user wearing the helmet camera) it will be appreciated that numerous other configurations are possible. For example, the helmet camera 130 could be configured in a two image sensor arrangement with sensors oriented north and south, or northeast and northwest, and in a three image sensor arrangement with image sensors oriented northeast, northwest, and south, or north, southwest, and southeast. In another arrangement, two image sensors could both be oriented north, for bifocal image data collection and the corresponding option to produce three dimensional images.

In the illustrated four image sensor embodiment, the protective housing 136 comprises a longitudinal housing 139 and a transverse housing 137. The longitudinal housing 139 may comprise cavities for image sensors oriented north and south, while the transverse housing 137 may comprise cavities for image sensors oriented east and west. The protective housing protective housing 136 as a whole, or one or the other of the longitudinal housing 139 or transverse housing 137 individually, may have a surface such as bottom surface 138 that is contoured to fit atop a helmet 101.

The illustrated bottom surface 138 is speckled to represent an interlocking material that may adhere to the bottom surface to serve as an attaching means. In this embodiment, interlocking material on bottom surface 138 would be removably attachable to a complimentary interlocking material 103 adhered to the surface of the host helmet 101. Other exemplary attaching means for securing the protective housing 136 atop a helmet 101 or other host may include, by way of example but not limitation, a threaded post, a permanent glue, one or more snaps, one or more tie-downs that travel up and over the protective housing 136, and/or a "plug in" arrangement where one or more flexible members disposed, e.g. on the protective housing 136 bend upon insertion into receptacles in the helmet 101, then snap into place when fully inserted.

The protective housing 136 may further comprise a complimentary equipment cavity 135, and any number of other cavities as necessary to accommodate complimentary equipment. Complimentary equipment cavity 135 comprises a cavity within the protective housing 136. Complimentary equipment cavity 135 may have its opening on the bottom surface 138, as illustrated, or on any other surface of the protective housing 136. Alternatively, where complimentary equipment is built into the protective housing 136 at the time of manufacture, complimentary equipment cavity 135 may be a strictly internal cavity without a user-accessible opening. Other means of allowing for integration of complimentary equipment comprise, for example, any means of attaching complimentary equipment to the outer surfaces of protective housing 136. Exemplary complimentary equipment that may be advantageously disposed within complimentary equipment cavity 135 or otherwise integrated with the helmet camera 130 is discussed in greater detail below.

In one embodiment, the protective housing 136 may comprise appropriate apparatus for rotating the various image sensors with respect to the helmet. Rotation of the image sensors may be used, for example, to incrementally or continuously capture a panoramic view. Such footage may be manipulated by software on the image recording device, or later edited on a larger more powerful computing device. An advantageous rotation mechanism preferably allows for a full 360 degree rotation without disrupting image capture by the image sensors. When used with a single image sensor, the image sensor can for example make a continuous rotation while generating video data. Various algorithms can be used to "fill in" collected video data as necessary. For example, if an aircraft is approaching from one direction, the aircraft would be seen once per rotation, and would be significantly closer on each viewing. The captured video could be stored and displayed as captured, or for example in a filter mode that filters for a particular object of interest. Also, real time adjustments are possible wherein when an object of interest is identified, the camera ceases its continuous rotation and instead "locks on" to the identified object of interest.

When multiple images sensors are used, less than 360 degree rotation may be acceptable, coupled with appropriate stitching software to stitch various received images together. It will be appreciated that to simplify cabling and so forth it may be preferable to implement wireless communications between the image sensors and image recording device as necessary.

Image sensors 141, 144 may comprise any device that converts a visual image to an electric signal. For example, a variety of such devices are used in today's digital cameras. Very generally, a Charge-Coupled Device (CCD) arrangement may be used in one exemplary embodiment. In another embodiment, a Complementary Metal Oxide Semiconductor (CMOS) type arrangement may be used. Any image sensor now in use or later developed may be appropriate, depending on the embodiment and its desired cost, quality, and size specifications. For example, image sensors in use today include the bayer sensor, the Foveon X3 sensor, and the 3CCD sensor. While the 3CCD sensor is generally more expensive than a single CCD sensor, it also captures a better quality image so may be appropriate where image quality is worth the corresponding expense. It will be appreciated that the selected image sensor may further include a sensor housing and appropriate lens, electrical circuitry and communication wiring.

The various image sensors 141, 144 may be communicatively coupled to a multi channel flexible cable 121 emerging from the protective housing 136. The cable 121 is adapted to carry image signals from said plurality of image sensors 141, 144 to an image recording device such as included inside 110 in FIG. 1.

There are a variety of multi channel cables available today, any of which may be used. For example, many audio/video cables, fiber optic cables, coaxial cables, and so forth are capable of carrying multiple channels. A cable may be multi channel by virtue of having separate "wires" or other means for transmitting electrical signals, each dedicated to a unique channel (i.e. each wire communicatively coupled with an image sensor). In another embodiment, a cable may be multi channel by using multiplexing apparatus. For example, signals from each image sensor can feed into a multiplexer, which transmits such signals over single wire in cable 121, combining them in such a way as to be separatable by for example a video recording or replay device at an opposite end of such cable 121.

In an alternative embodiment, image sensors may be coupled to a wireless transmitter for wireless transmission of video data. The wireless transmitter may be located, for example, in a complimentary equipment cavity of the protective housing. A wireless transmission protocol such as a BLUTOOTH® protocol, Wireless USB, 802.11, or any other wireless protocol may be used to transmit data to an image recording device.

Image sensors 141, 144 may comprise either electronic or optical zoom apparatus. Also, image sensors 141, 144 may be configured to detect images in wavelength beyond the visible spectrum. For example, in one embodiment that may have utility for example in police and firefighting applications, one or more image sensors may detect infrared and or so-called "thermal imaging" images.

Image sensors 141, 144 may capture image stills or video, or both. The term "image" as used herein can be a still image or a video image. While in general video capture is the contemplated use of the multidirectional video capture assembly, it will be appreciated that still image capture is also possible and could be advantageous in some scenarios. For example, to preserve battery life and reduce memory consumption, some embodiments may periodically capture still images from image sensors 141, 144 in lieu of video.

Finally, image sensors 141, 144 may be advantageously equipped with a lens-protecting shutter. The lens-protecting shutter may be used for example to protect an image sensor lens from dust and water, scratching and smudging. In one embodiment, a revolving tape mechanism can be utilized to keep the lens clean at all times.

Cable 121 may terminate in a tension quick-release component 121A that engages with a complimentary tension quick-release component 122A attached to a further length of cable 122, which in turn may continue to an interface to a video recording or replay device. The tension quick-release component 121A provides safety and convenience, by allowing the user to easily disconnect the helmet camera 130 from other components. It also safeguards against cable breaking or stretching in the event that the cable is snagged for example by a tree branch as a user is downhill skiing. Tension quick-release components 121A and 122A may provide a plurality of male/female wire connections, e.g., one for each wire inside cable 121.

Figure 3:
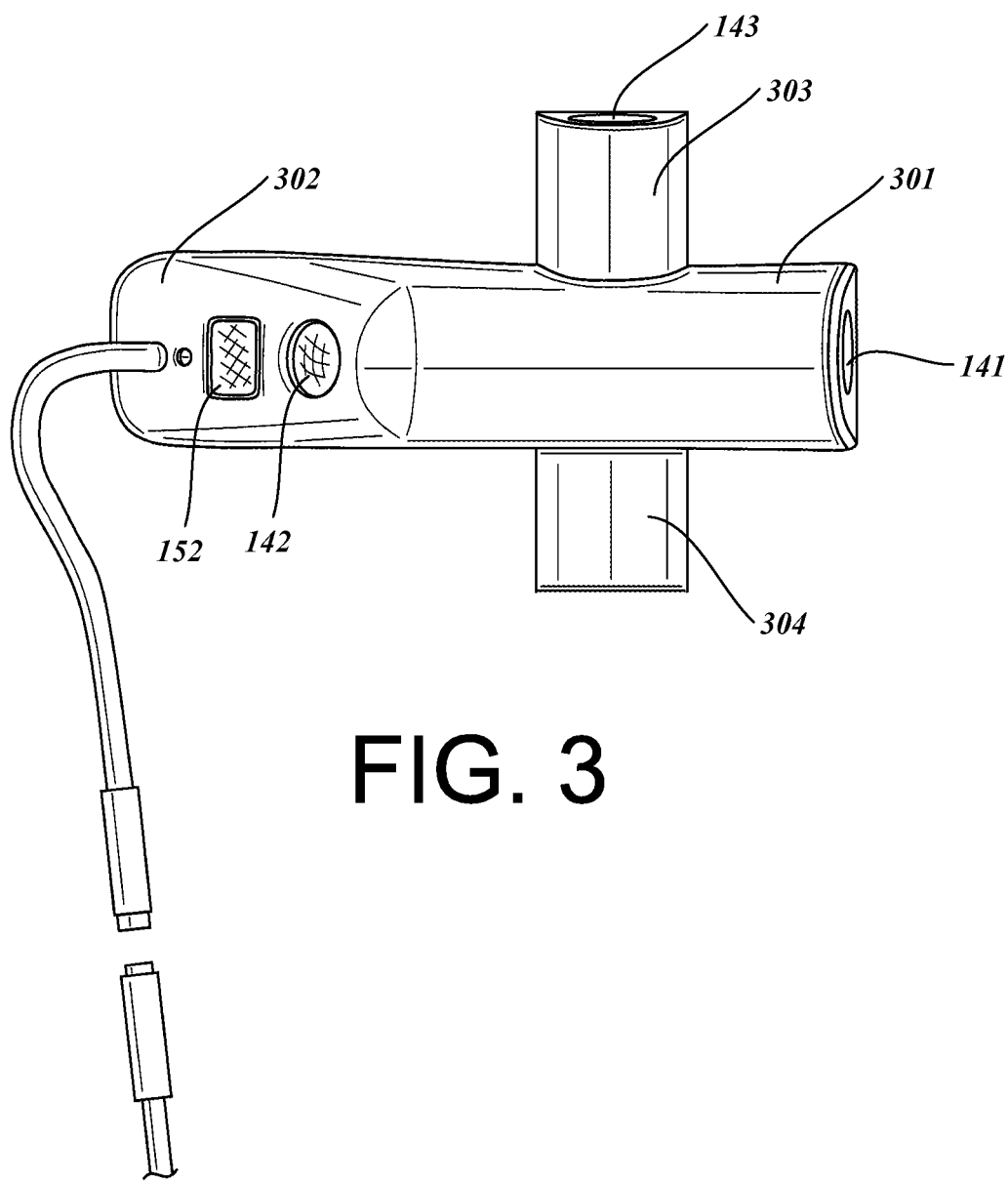
FIG. 3 illustrates a top view of the multidirectional helmet camera.

FIG. 3 illustrates a top view of an exemplary four image-sensor helmet camera. From this view, the north image sensor 141, west image sensor 143, and south image sensor 142 can be seen. This view also clearly demonstrates that in this embodiment, the protective housing may comprise a north housing 301, south housing 302, west housing 303 and east housing 304. North and south housing 301 and 302 may both be formed in a continuous longitudinal housing, as illustrated, while west and east transverse housings 303 and 304 may be affixed to the sides of such longitudinal housing.

FIG. 3 further illustrates exemplary complimentary equipment in the form of a brake light 152 visible from the rear of the helmet camera. Brake light 152 can fit into the complimentary equipment cavity as discussed above. Brake light 152 illuminates when the user brakes or otherwise slows down while wearing the helmet camera. In one embodiment, this is achieved without interfacing to a vehicle, by using an accelerometer. For example, an accelerometer may be also disposed within the complimentary equipment cavity, or may be communicatively coupled to brake light 152 by way of cable 121. In another embodiment, the brake light 152 interfaces with vehicle electronics, and illuminates in response to a signal from a vehicle. Such signal may be wireless, or may be received via cable 121, e.g. from a video record/replay device that is in turn communicatively coupled to onboard vehicle electronics. In a further embodiment, brake light 152 may instead be configures as a tail light, and remain continuously illuminated, or, e.g., continuously flashing, for enhanced visibility of the helmet camera.

Figure 4:
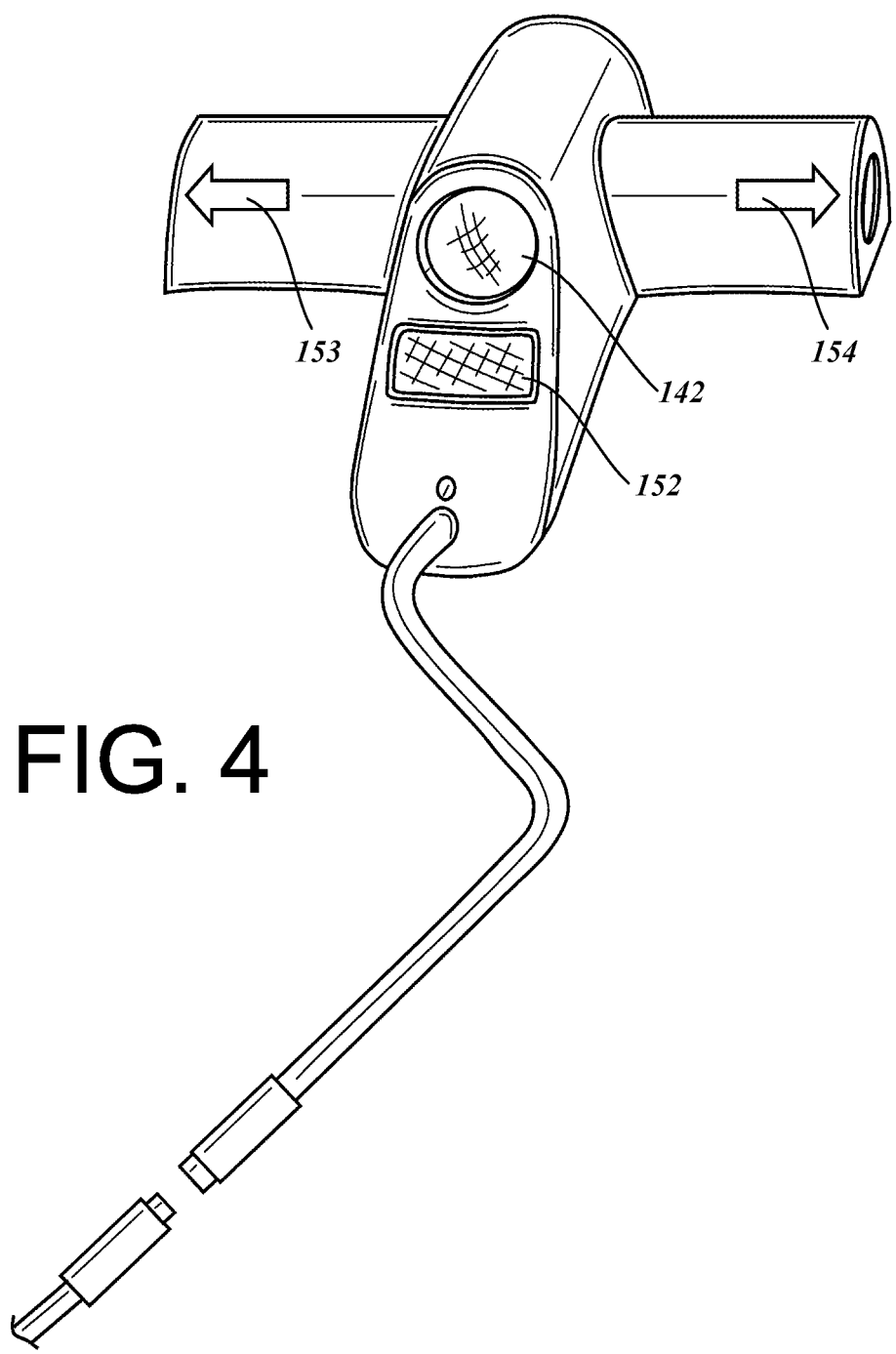
FIG. 4 illustrates a rear view of the multidirectional helmet camera, equipped with complimentary equipment.

FIG. 4 illustrates a rear view of an exemplary four image sensor helmet camera. This view shows south image sensor 142, brake light 152, and also additional complimentary equipment in the form of turn signals 153 and 154 disposed in rear-facing portions of the transverse housings. The west turn signal 153 illuminates when the user turns west, and east turn signal 154 illuminates when the user turns east. Like the brake light 152, Turn signals 153 and 154 can be responsive to signals from an accelerometer. In the illustrated embodiment, with both brake light and turn signals, the accelerometer may have 2 axes, a longitudinal axis for use with brake light 152 and a transverse axis for use with turn signals 153 and 154. Also like the brake light, the turn signals may be responsive to signals from a vehicle or from user controls.

Figure 5:
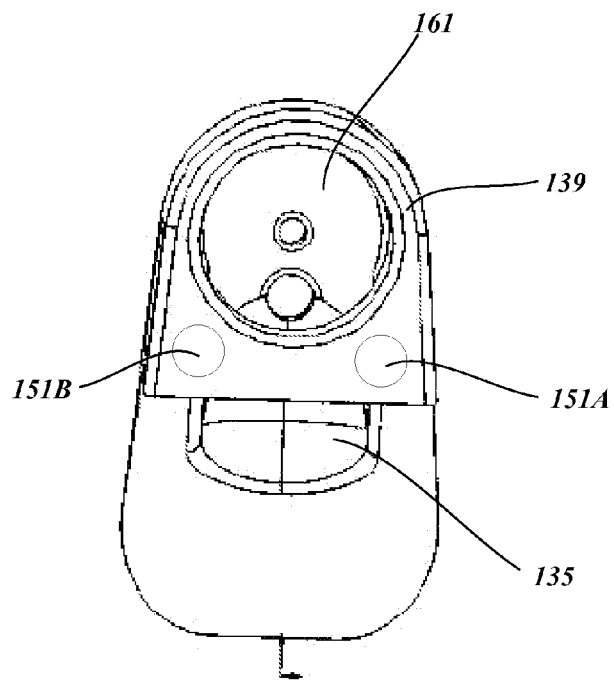
FIG. 5 illustrates a longitudinal helmet camera housing with complimentary equipment cavity in said housing.
Figure 6:
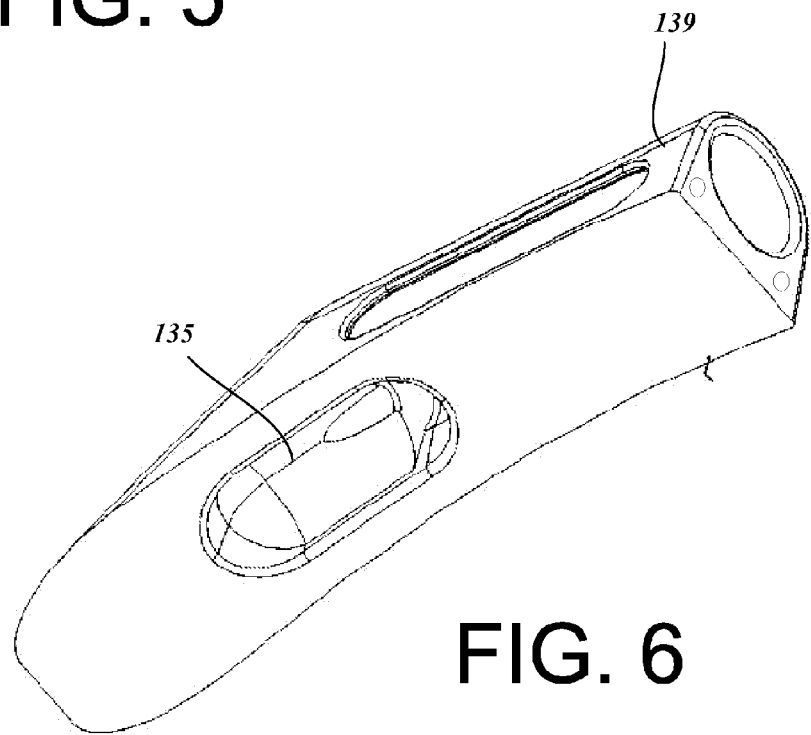
FIG. 6 provides another view of a longitudinal helmet camera housing from FIG. 5.

FIGS. 5 and 6 illustrate views of a longitudinal housing 139 as may be used in various embodiments. In FIG. 5, an image sensor cavity 161 for a north oriented image sensor is clearly shown. Image sensor cavity 161 may lead to a complimentary equipment cavity 135, which in this embodiment doubles as a point of insertion for inserting an image sensor into image sensor cavity 161. Complimentary equipment cavity 135 may further extend to 151A and 151B, for example when complimentary equipment requires an outlet on a north facing surface of the helmet camera.

Exemplary complimentary equipment that may be utilized in connection with the illustrated embodiment comprises, but is not limited to, a brake light and turn signals, a microphone, a laser pointer, an avalanche beacon, a Global Positioning System (GPS) locator, a radio signal communications apparatus, logo illumination, and/or a vibration or alarm mechanism for signaling the wearer of the helmet camera.

A microphone for use with the helmet camera can preferable collect audio data on multiple audio channels and be coupled to appropriate frequency filtering apparatus. Radio signal communications apparatus may communicate according to any of the variety of wireless communications protocols in use today or later developed. For example, Wi-Fi as defined by the 802.11a, 802.11b, 802.11g specifications, wireless Universal Serial Bus (USB), Bluetooth®, and Wide Area Network (Cellular) communications are presently available wireless communications protocols. To generate appropriate wireless signals, a signal generator and antenna may be disposed inside the helmet camera. Microphone and radio signal communications apparatus can be coupled with an audio output means, allowing the user to wirelessly communicate with others in range of the wireless signal.

Logo illumination is used for brand promotion and also to enhance the aesthetic of the helmet camera. Logo illumination can be accomplished for example using low power illumination means such as Light Emitting Diodes (LEDs) disposed in a cavity such as 151B. A logo is then carved out of the opaque housing sidewall, and replaced with a translucent material which allows light from the LEDS to filter through.

Laser pointer, avalanche beacon, and Global Positioning System (GPS) locator are each examples of complimentary equipment that may be loaded into a complimentary equipment cavity by a user as necessary for the user's individual activity, or may be installed at time of manufacture to produce a helmet camera that is especially advantageous for a particular activity. For example, an avalanche beacon may be especially useful for mountaineering applications such as rock and ice climbing. A laser pointer could be substituted with a headlight that provides, e.g., cyclists and/or SCUBA divers with additional safety and visibility.

A vibration or alarm mechanism for signaling the wearer of the helmet camera may be advantageously placed in a complimentary equipment cavity in one embodiment. A vibration may be produced by for example a weighted electrical motor, while an alarm is produced by a speaker, buzzer, or other noise generating means. The vibration or alarm mechanism can interact with the video recording device to notify the user of certain events. For example, as described below, if face recognition software running on the video recording device makes a recognition as it analyzes real-time data from image sensors, the vibration or alarm mechanism can be activated.

Figure 7:
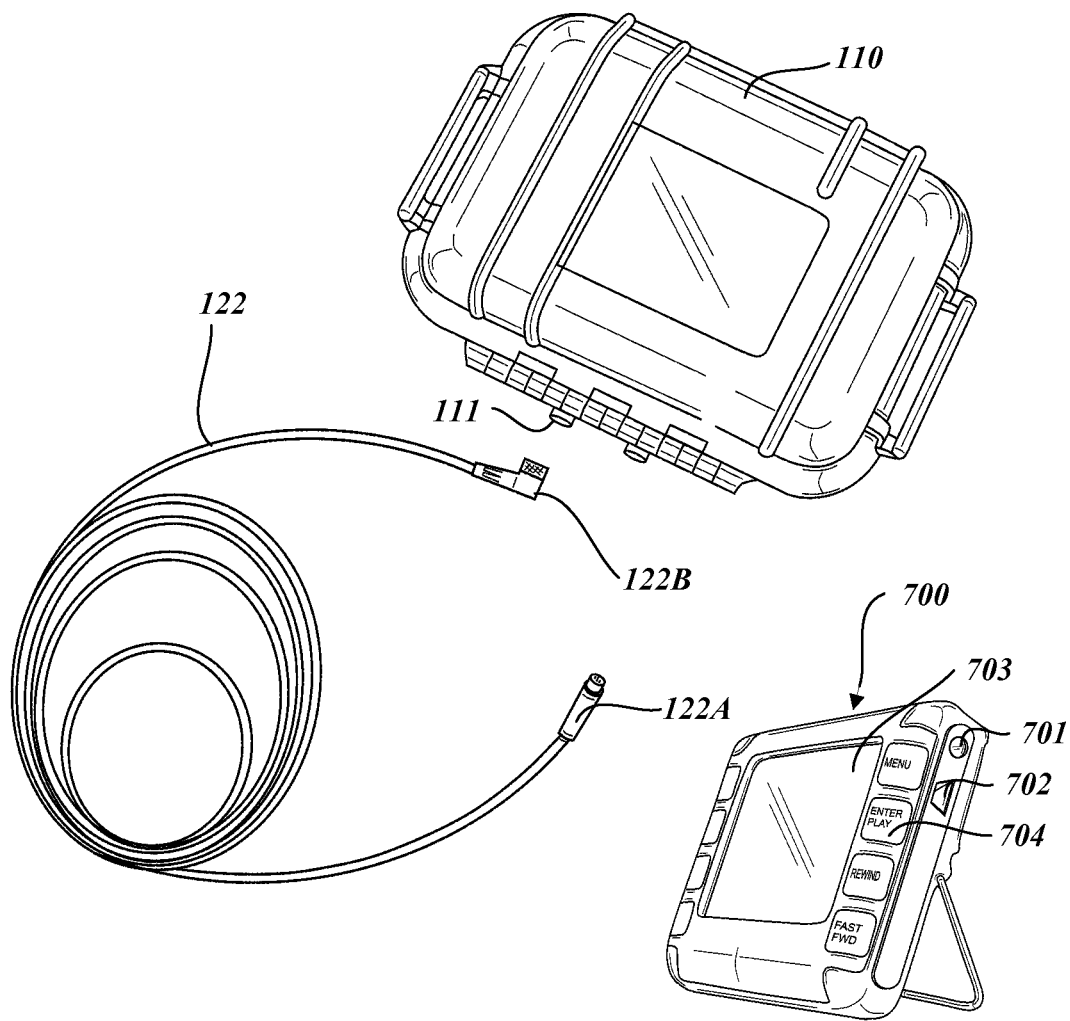
FIG. 7 illustrates equipment as may accompany the multidirectional helmet camera in one embodiment of a multidirectional video capture assembly.

FIG. 7 illustrates multidirectional video capture assembly components that are advantageously combined with the multidirectional helmet camera in one embodiment. The illustrated components comprise a protective case 110 with cable interface 111, a flexible cable with case interface 122B and tension quick-release interface 122A, and an electronic image recording and display device 700.

Case 110 can be made of durable, lightweight material such as plastic or metal. In one embodiment, case 110 may be watertight when closed, so that when electronic device 700 is placed inside the case 110, the case 110 and device 700 may be submerged in liquid without damage to device. An interface 701 in the device 700 can connect to a device interface (not shown) inside the case 110 so that device 700 receives signals from the helmet camera via cable 122 and cable interface 111.

In one embodiment, case 110 is also preferably small enough to be easily portable in one adult hand. While the size of case 110 limits the size of device 700 and therefore the available power and number of features that can be included in the device, the small size of the case provides a portability factor that is advantageous in many contemplated uses of the assembly.

Device 700 may comprise a display 703, computer system interface such as USB interface 702, and various controls such as 704. Device 700 is, in general, an electronic device with processor and memory as described in connection with FIG. 8. As such, device 700 is configurable in a wide variety of ways and with any of a huge variety of features as will be appreciated by those of skill in electronics. Some advantageous features that may be incorporated into device 700 are set forth here, recognizing that such features may be selectively combined with other features in many specific implementations.

Figure 8:
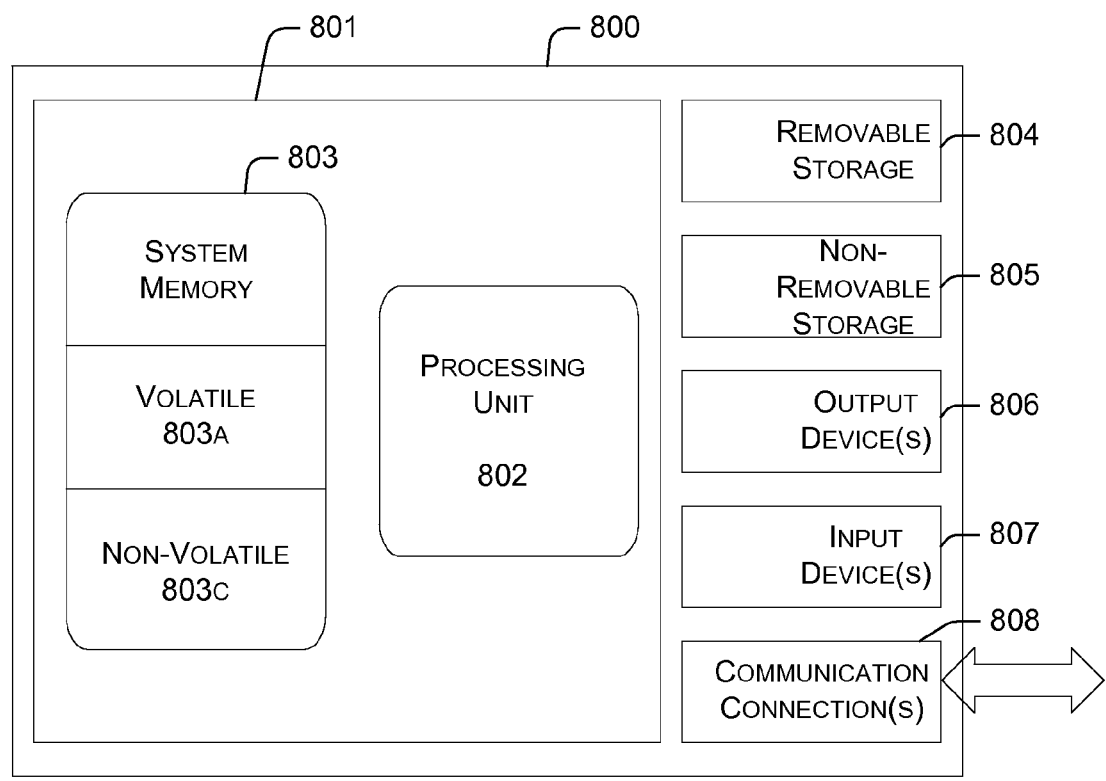
FIG. 8 illustrates a schematic diagram of an exemplary video recording device.

With reference to FIG. 8, an exemplary computing device 800 suitable for use in connection with the invention is broadly described. In its most basic configuration, device 800 typically includes a processing unit 802 and memory 803. Depending on the exact configuration and type of computing device, memory 803 may be volatile (such as RAM), non-volatile (such as ROM, flash memory, etc.) or some combination of the two. Additionally, device 800 may have mass storage (removable 804 and/or non-removable 805) such as magnetic or optical disks, tape, or flash memory. Because device 800 advantageously stores a maximal amount of video data received from the helmet camera, mass storage should be maximized as device size and cost effectiveness permits.

Similarly, device 800 may be connectable to input devices 807 such as a keyboard and mouse, vehicle on-board computers and user controls. Output devices 806 connectable to device may include for example audio output means, vehicle on-board computers and user controls, large screen displays that present a GUI as a graphical aid accessing the functions of the computing device 800, and for example displays such as a Heads Up Display (HUD) that can project an image onto a helmet visor 102.

Other aspects of device 800 may include communication connections 808 to other devices, computers, networks, servers, etc. using either wired or wireless media. All these devices are well known in the art and need not be discussed at length here.

Features of the device 800 may be implemented in hardware and software. Software features are implemented using computer-executable instructions, such as program modules, being executed by device hardware. Generally, program modules include routines, programs, objects, components, data structures, etc. that perform particular tasks or implement particular abstract data types.

Referring back to FIG. 7, in one advantageous configuration, device 700 may be configured to store video signals that are received simultaneously from the multiple image sensors in an appropriate format for replaying such video. For example, at minimum, information indicating a time that video frames are captured is kept, so that the video feeds remain appropriately correlated in time. In a further embodiment, the device 700 may store the multiple received signals in a split screen format, so that on replay all simultaneously captured video is displayed simultaneously in different portions of the display. Also, as alluded to above, device may be adapted to periodically capture still images from the image sensors on the helmet camera. These stills may be similarly stored with appropriate data to correlate those captured at the same time, and may be stored for split screen replay.

In a further embodiment, device also captures additional data and overlays a data display on the captured video for replay. For example, where a device is interfaced with a vehicle computer, the device can capture vehicle speed, and overlay a Miles Per Hour (MPH) data display on the video showing the views of from the multi directional helmet camera. Similarly, device 700 may record Rotations Per Minute (RPM) data, braking data, temperature data, and acceleration data, and may overlay a display of such data on the video showing the views of from any image sensor(s) coupled to the device 700. Where a device is interfaced with a firearm, upon receipt of a wireless signal from trigger sensor or barrel transducer coupled to a firearm, the device may overlay on corresponding video a graphic indication that shots were fired. A device could also receive data from many other instruments, such as, for example, a heart rate monitor.

In another embodiment, device 700 may be equipped with face recognition software that will identify a person and sound an alarm upon such recognition. The alarm can be, for example, an audible noise, or a vibration produced by complimentary equipment that vibrates upon appropriate signal from the video recording device 700, as described above. In embodiments providing this feature, the user is preferably provided with appropriate device interface to program duration and intensity of the alarm, and the sensitivity of the face recognition software.

Also, in one embodiment, the face recognition software can operate to start and/or stop image recording by the video recording device. For example, face recognition software can analyze an incoming video stream for faces on file—or for any face at all. When a face is recognized, the face recognition software initiates video recording by the device. A timer may be used to record for a predetermined time interval after the recording device begins recording. For example, recording may stop after 5 minutes.

In light of the diverse environments that may be built according to the general framework of provided in this specification, the systems and methods provided herein cannot be construed as limited in any way to a particular architecture. Instead, the present invention should not be limited to any single embodiment, but rather should be construed in breadth and scope in accordance with the appended claims.

The invention claimed is:

1. A multidirectional helmet camera separate from a helmet and configured to hold a plurality of image sensors and to attach atop said helmet, comprising:
   a protective housing comprising:

a longitudinal housing portion defining a forward end and a rear end, and a first longitudinal side surface, a second longitudinal side surface and bottom surface spanning between the forward end and rear end, the longitudinal housing having a length spanning between the forward end and rear end, and a width defined between the first and second side surfaces, wherein the length is greater than the width;

a first transverse housing portion extending transversely from the first longitudinal side surface, wherein an extension length of the first transverse housing portion normal to the first longitudinal side surface is substantially less than the length of the longitudinal housing portion; and a second transverse housing portion extending transversely from the second longitudinal side surface, wherein an extension length of the second transverse housing portion normal to the second longitudinal side surface is substantially less than the length of the longitudinal housing portion;

an equipment cavity defined in at least the longitudinal housing portion and configured to hold equipment of a user;

wherein a portion of the bottom surface is curved inward in a longitudinal direction and contoured to fit atop said helmet such that the protective housing rises vertically above said helmet by a value less than the longitudinal length of the longitudinal housing portion;

said plurality of image sensors disposed within the protective housing and including at least one image sensor associated with each of the forward end of the longitudinal housing, the rear end of the longitudinal housing, the first transverse housing and the second transverse housing;

a triggering mechanism configured to obtain an attention of the user;

a memory in operable communication with the plurality of image sensors and configured to store image data from the plurality of image sensors for at least a predetermined amount of time;

a processor in operable communication with the plurality of image sensors and configured to control real time viewing of the image data from the plurality of the image sensors, the processor in communication with the triggering mechanism, the processor configured to activate video recording using at least one selected image sensor when the triggering mechanism is activated; and a display unit attached to the helmet, the display unit in communication with the processor, wherein the processor commands the display unit to display images from at least one of the plurality of image sensors when the triggering mechanism is activated.

2. The multidirectional helmet camera of claim 1, further comprising a multi channel flexible cable emerging from the rear end of the protective housing, said cable configured to carry image signals from the plurality of image sensors the memory, the cable comprising a tension-actuated quick-release.

3. The multidirectional helmet camera of claim 1, further comprising a rotation mechanism for rotating at least one of the plurality of image sensors with respect to said helmet.

4. The multidirectional helmet camera of claim 1, further comprising a brake light located on the rear end of said protective housing.

5. The multidirectional helmet camera of claim 1, further comprising left and right turn signals located on the respective first transverse housing and second transverse housing.

6. The multidirectional helmet camera of claim 1, further comprising a microphone disposed within the equipment cavity in said protective housing.

7. The multidirectional helmet camera of claim 6, wherein said microphone collect audio data on a plurality of audio channels.

8. The multidirectional helmet camera of claim 1, wherein at least one of the plurality of image sensors is configured to sense light in the infrared spectrum.

9. The multidirectional helmet camera of claim 1, further comprising at least one of a vibration mechanism and an alarm mechanism disposed within said equipment cavity in said protective housing, said vibration and alarm mechanisms being activated by face recognition software executed by said image recording device.

10. The multidirectional helmet camera of claim 1, further comprising a laser pointer disposed within the equipment cavity in said protective housing.

11. The multidirectional helmet camera of claim 1, wherein at least one of said plurality of image sensors is configured as a zoom apparatus.

12. The multidirectional helmet camera of claim 1, further comprising an avalanche beacon disposed within the equipment cavity in said protective housing.

13. The multidirectional helmet camera of claim 1, further comprising a Global Positioning System (GPS) locator disposed within the equipment cavity in said protective housing.

14. The multidirectional helmet camera of claim 1, further comprising a cable extending from a rear surface of the longitudinal housing and attaching to a portable video recording device.

15. The multidirectional helmet camera of claim 14, wherein said image recording device comprises a plurality of video input channels and is configured to store simultaneously received video input in a split screen format.

16. The multidirectional helmet camera of claim 1, wherein at least one of said plurality of image sensors is configured to produce a video signal.

17. The multidirectional helmet camera of claim 1, wherein the triggering mechanism includes a vibration producing device.

18. The multidirectional helmet camera of claim 1, wherein real time viewing includes viewing an environment of the user without video recording the environment.

19. The multidirectional helmet camera of claim 1, wherein the memory stores image data from the real time viewing for at least a predetermined amount of time.

20. The multidirectional helmet camera of claim 1, wherein the processor commands the memory to permanently store at least a portion of the image data that was obtained before the triggering mechanism was activated.

21. The multidirectional helmet camera of claim 1, wherein the processor activates a heads up display device when the triggering mechanism is activated.

22. The multidirectional helmet camera of claim 1, wherein a respective lens is disposed adjacent each of the forward end of the longitudinal housing, the rear end of the longitudinal housing, a distal end of the first transverse housing and a distal end of the second transverse housing such that each respective lens is flush with each of said ends.

23. A helmet camera comprising:
a housing, comprising:
a longitudinal housing portion defining a forward end and a rear end, and a first longitudinal side surface, a second longitudinal side surface and bottom surface spanning between the forward end and rear end, the longitudinal housing having a length spanning between the forward end and rear end, and a width defined between the first and second side surfaces, wherein the length is greater than the width;

a first transverse housing portion extending transversely from the first longitudinal side surface, wherein an extension length of the first transverse housing portion normal to the first longitudinal side surface is substantially less than the length of the longitudinal housing portion; and a second transverse housing portion extending transversely from the second longitudinal side surface, wherein an extension length of the second transverse housing portion normal to the second longitudinal side surface is substantially less than the length of the longitudinal housing portion;

an equipment cavity defined in at least the longitudinal housing and configured to hold equipment of a user;

a plurality of image sensors located within the housing wherein at least one associated with each of the forward, rear, first side and second side of the helmet to which the housing is attached;

an alert notification device configured to obtain the helmet wearer's attention;

a memory configured to store image data from the image sensors for at least a predetermined amount of time;

a processor configured to control real time viewing of image data from the image sensors, the processor in communication with the alert notification device, the processor configured to activate video recording using at least one selected image sensor when the alert notification device is activated; and a display unit attached to the helmet, the display unit in communication with the processor, wherein the processor commands the display unit to display images from at least one of the plurality of image sensors when the alert notification device is activated.

24. The helmet camera of claim 23, wherein the triggering mechanism includes a vibration producing device.

25. The helmet camera of claim 23, wherein real time viewing includes viewing an environment of the helmet wearer without video recording the environment.

26. The helmet camera of claim 23, wherein the memory stores image data from the real time viewing for at least a predetermined amount of time.

27. The helmet camera of claim 23, wherein the processor commands the memory to permanently store the image data that was obtained before the alert notification device was activated.

28. The helmet camera of claim 23, wherein each of the first transverse housing portion and second transverse housing portion each have a bottom surface that includes an inward curved portion generally conforming to a helmet curvature.

29. A method for operating a helmet camera in an environment, the method comprising:

disposing a helmet camera housing on the top portion of a helmet, the housing defining a longitudinal bottom surface having an inward curved portion generally conforming to a curvature of the top of the helmet such that the camera housing does not extend vertically above the helmet in a dimension greater than a longitudinal length of the housing, the housing further defining a longitudinal housing portion having a forward end and a rear end, and a first longitudinal side surface and a second longitudinal side surface spanning between the forward end and rear end, the housing including a first transverse housing extending transversely from the first longitudinal side surface, a second transverse housing extending transversely from the second side surface, and an equipment cavity defined in at least the longitudinal housing and configured to hold equipment of a user;

disposing a plurality of image sensors in the housing and arranging them such that at least one of the plurality of image sensors is associated with each of the front end, rear end, first transverse housing and second transverse housing;

viewing the environment to the front, rear and both transverse sides of the helmet using a plurality of helmet mounted image sensors in which at least one of the image sensors is oriented for viewing a portion of the environment outside of a helmet wearer's forward field of vision;

identifying an object of interest with the at least one image sensor;

providing an alert notification to the helmet wearer;

continually storing image data from the image sensors for at least a predetermined amount of time;

activating a video recording using the at least one image sensor when the alert notification is provided; and displaying at least a portion of the image data on a display unit visible by the helmet wearer when the alert notification is provided.

30. The method of claim 29, wherein identifying the object includes identifying a person using face recognition software.

31. The method of claim 29, wherein providing the alert notification includes causing a vibration of the helmet camera.

32. The method of claim 29, wherein activating the video recording, includes permanently storing the image data captured during a predetermined amount of time that preceded the alert notification.

33. The method of claim 29, further comprising activating a heads up display unit upon receiving the alert notification.

* * * * *